United States Patent
Malrick

(10) Patent No.: US 7,114,731 B2
(45) Date of Patent: Oct. 3, 2006

(54) PORTABLE COLLAPSIBLE RICKSHAW

(76) Inventor: David A. Malrick, 8289 Spring Lake Rd., Mounds View, MN (US) 55112

( * ) Notice: Subject to any disclaimer, the term of this patent is extended or adjusted under 35 U.S.C. 154(b) by 97 days.

(21) Appl. No.: 10/923,646

(22) Filed: Aug. 20, 2004

(65) Prior Publication Data

US 2005/0077705 A1    Apr. 14, 2005

Related U.S. Application Data

(60) Provisional application No. 60/497,039, filed on Aug. 22, 2003.

(51) Int. Cl.
*B62B 1/00* (2006.01)
(52) U.S. Cl. .................... 280/47.25; 280/47.2
(58) Field of Classification Search ........... 280/47.11, 280/47.12, 47.131, 47.17, 47.2, 47.24, 47.25, 280/DIG. 11, 762, 763.1, 767, 63
See application file for complete search history.

(56) References Cited

U.S. PATENT DOCUMENTS

| | | | | |
|---|---|---|---|---|
| 4,313,611 A * | 2/1982 | Heinze et al. | ................ | 280/63 |
| 4,822,065 A | 4/1989 | Enders | .................. | 280/47.331 |
| 5,062,652 A * | 11/1991 | Burke | ......................... | 280/64 |
| 6,142,491 A * | 11/2000 | Darling, III | .................. | 280/30 |
| 6,142,492 A * | 11/2000 | DeLucia | ................ | 280/47.331 |
| 6,283,496 B1 * | 9/2001 | Dickmann | .................. | 280/652 |
| 6,530,598 B1 * | 3/2003 | Kirby | ......................... | 280/755 |
| 6,685,198 B1 * | 2/2004 | Hartman | ..................... | 280/1.5 |

* cited by examiner

*Primary Examiner*—Christopher P. Ellis
*Assistant Examiner*—Brian Swenson
(74) *Attorney, Agent, or Firm*—Vidas, Arrett & Steinkraus

(57) ABSTRACT

A portable, collapsible rickshaw like carrier has a collapsing main base which allows the rickshaw to be easily stored or transported.

3 Claims, 9 Drawing Sheets

PORTABLE COLLAPSIBLE RICKSHAW

CROSS-REFERENCE TO RELATED APPLICATION

This application is a utility application of provisional application No. 60/497,039, filed Aug. 22, 2003, the entire contents of which are herein incorporated by reference.

STATEMENT REGARDING FEDERALLY SPONSORED RESEARCH OR DEVELOPMENT

Not applicable.

BACKGROUND OF THE INVENTION

This invention relates to a rickshaw-like carrier that is easily collapsed to a small size for transportation or storage.

The art described in this section is not intended to constitute an admission that any patent, publication or other information referred to herein is "prior art" with respect to this invention, unless specifically designated as such. In addition, this section should not be construed to mean that a search has been made or that no other pertinent information as defined in 37 C.F.R. § 1.56(a) exists.

BRIEF SUMMARY OF THE INVENTION

The invention provides a lightweight, portable carrier that may be used to move light cargo or transport people. The carrier, or rickshaw, may be propelled by a walking person or may be attached to another source such as a person on a bike or even a motorized vehicle such as an all-terrain vehicle.

The rickshaw has a base formed by adaptor blocks and poles which are pinned together to allow rapid assembly and disassembly as well as to allow the unit to be folded into a compact unit for storage or transporting.

The adaptor blocks include spaced apertures to which the support poles may be attached as well as attaching pull poles, legs, wheels, arms, backs or shades, to name a few of the variations possible.

BRIEF DESCRIPTION OF THE DRAWINGS

A detailed description of the invention is hereafter described with specific reference being made to the drawings in which.

DETAILED DESCRIPTION OF THE INVENTION

Figure 1:
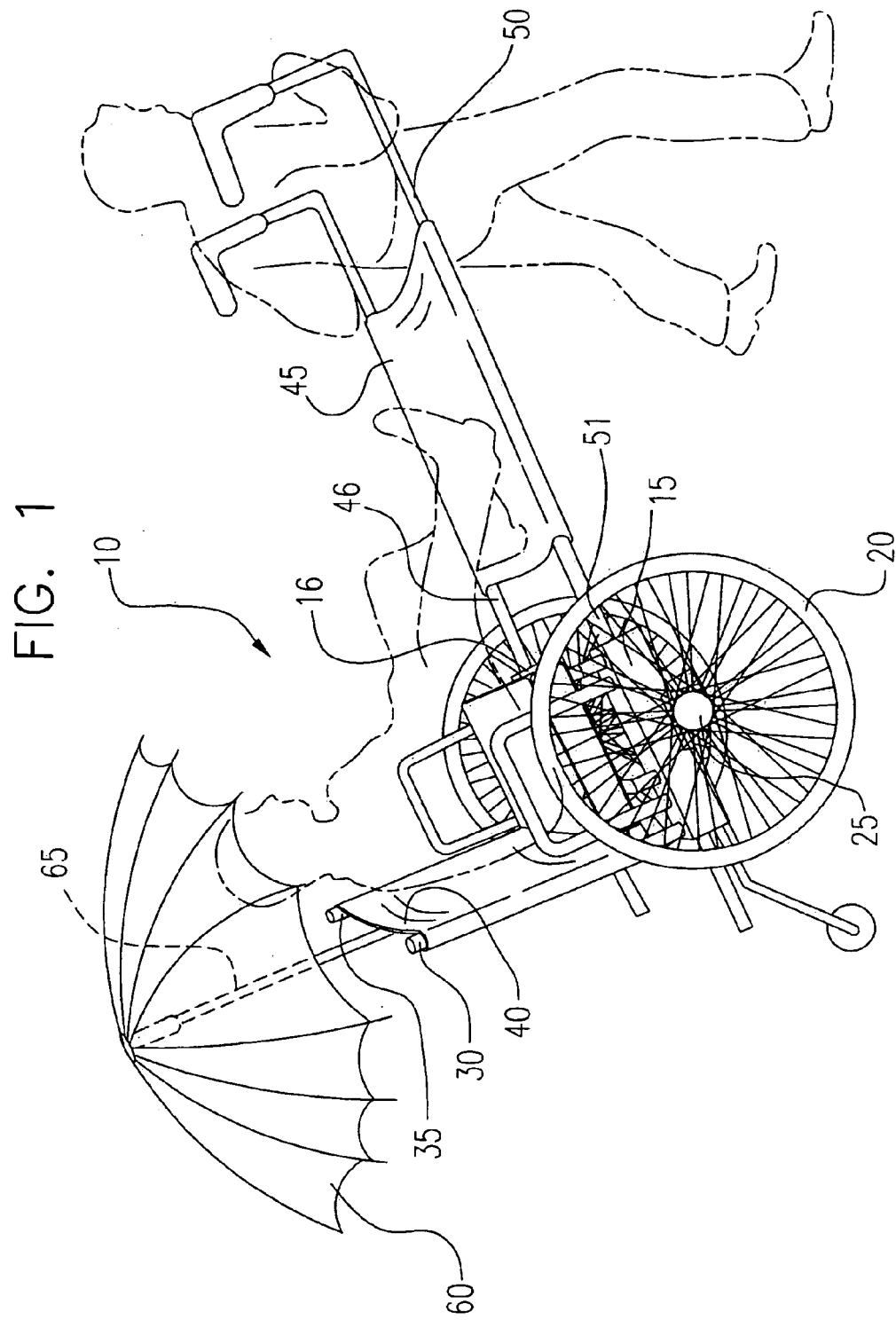
FIG. 1 is a perspective view of the carrier, depicting both rider and human source of propulsion.

The purpose of this invention is to provide a vehicle that enables a person to transport cargo easily on hard or soft surfaces, by pulling or pushing. This cargo may be either people or items. It is made to move easily over paved or unpaved surfaces, such as grass or wood chipped trails. The power needed to move this vehicle is supplied by, but not limited to, human power or a tool such as a bicycle. (FIG. 1). The power can be delivered via a pulling mechanism. The pulling mechanism could be several members coupled together to form a U-shaped element. The U-shaped element could be adapted for engagement with the power source. One of ordinary skill in the art would recognize that a number of other configurations of pulling mechanisms are possible.

Referring to FIG. 1 of the drawings, the preferred embodiment of the carrier is shown and indicated generally at 10. FIG. 1 depicts the carrier as the handles are initially lifted off ground; it is desirable, however, to pull the carrier with the handles at waist height or slightly lower. A pair of adaptor blocks is shown in FIG. 1, comprising first adaptor block 15 and second adaptor block 16. FIG. 1 shows first adaptor block 15 releasably engaged to locomotion mechanism 20 by engagement mechanism 25. It is understood that locomotion mechanism 20 can be a wheel, a skid, or any other embodiment that would reduce friction between a surface and carrier 10. FIG. 1 also shows first and second back poles 30 and 35, releasably engaged to first adaptor block 15 and second adaptor block 16, respectively. A material 40 extends between the first and second back poles, providing support for the cargo being transported. Although shown in an upright position, it may be desirable to build the back support such that the back poles are angled toward the back of the carrier, thereby allowing a rider to sit in a more reclined position. First handle assembly 45 with first end 46, and second handle assemblies 50 with first end 51 are shown releasably engaged to adaptor blocks 15 and 16. A material extends between the first and second handle assemblies, providing a cross brace 55 to further support the cargo or create a footrest during the carrier's motion or in a stationary position. It is not meant to be a step. When transporting non-human cargo, the cross brace can be slid to meet the bed, extending the platform's base to accommodate lightweight items. Additionally, the cross brace can be used as a bicycle splashguard by sliding it in the opposite direction to its desired position. Umbrella 60 is shown coupled to member 65 which is adapted to be releasably engaged to an adaptor block. It is understood that a variety of protective screens could be used as an alternative to umbrella 60. Umbrella 60 could be attached to a spreader by connecting back poles 30 and 35 if additional rigidity is desired FIG. 1 shows a person sealed on a seat above the support poles.

In some embodiments of the invention, umbrella 60 may be replaced by an awning. Awning poles may be coupled to the first and second back poles. A material could then be extended between the awning poles, thereby providing protection from direct sunlight or rain. The awning can be retracted.

Figure 2:
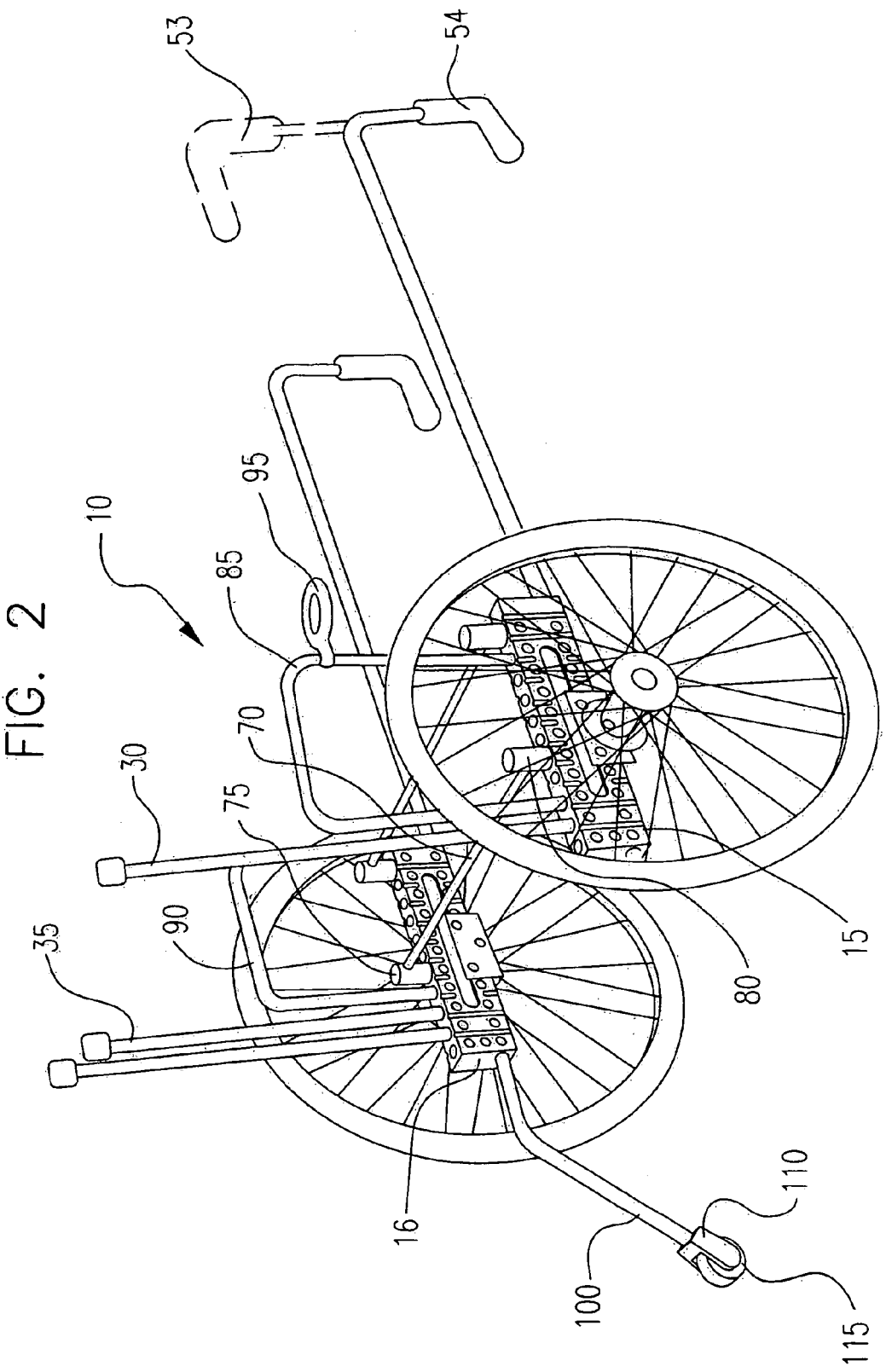
FIG. 2 is a perspective view of the carrier, without rider and no back or seat cushion.

FIG. 2 shows another view of the present invention. First end 75 of support pole 70 is shown releasably engaged to second adaptor block 16 and second end 80 of support pole 70 is shown releasably engaged to first adaptor block 15. A cushion or some other covering can be placed on the seat. The handle assemblies 45 and 50 can be inciter an upright position 53 or downward position 54. In the upright position, the handle assemblies create a plane for either pushing or pulling. In the downward position, the handle assemblies create a pair of front legs to stabilize the carrier while in a stationary state. Although not shown, the handles can also be turned 90° from the downward position. Furthermore, the handle ends shown at positions 53 and 54 can take on a variety of shapes other than the "L" shown. For instance, they could take on a more ergonomic "S"-type shape or may be joined to form a "U" shape. Side handles 85 and 90 are releasably engaged to first adaptor block 15 and second adaptor block 16, respectively, for safety supports. Material may be sewn on these handles to shield items from the motion of the tires. Holder 95 is shown coupled to side handle 85. It is understood that holder 95 may be coupled to side handle 90, or any member of the carrier. The rear stabilizing bar 100 has first end 105 releasably engaged to second adaptor block 16, and second end 110 coupled to a locomotion mechanism 115. Rear stabilizing bars prevent the carrier from tipping over backward. For simplicity FIG. 2 shows only one rear stabilizing bar 100. However, it may be desirable to have a rear stabilizing bar attached to each of the rear-most adaptor blocks. Although FIG. 2 depicts locomotion mechanism 115 as a wheel, it will be appreciated that other locomotion mechanisms, such as skids, may be used. Although not shown, a cargo platform could be releasably engaged to the adaptor blocks, above the rear stabilizing bars.

In some embodiments of the invention, adaptor blocks may be releasably secured together, resulting in a daisychain of adaptor blocks. For example, connecting members could be releasably engaged to an end of a first adaptor block and then releasably engaged to an end of a second adaptor block. Such a configuration of adaptor blocks could be used together with additional support poles 75 to increase the carrying capacity of the carrier. Of course, cushions or other coverings can be placed over the support poles.

In some embodiments of the invention, entire carriers may be daisychained together to make a train of carriers. In such an embodiment, a joint assembly, such as a swivel joint, could be used to releasably secure a rear pair of adaptor blocks of a first carrier with a front pair of adaptor blocks of a second carrier. A swivel joint assembly would join the carriers, but would allow each carrier some freedom of motion as they moved over uneven terrain. It is understood that additional carriers could be secured together. Also, when two carriers are joined together, people can be transported facing each other. This is accomplished by transferring the back and awning poles to the front position of the first pulled carrier's adaptor blocks and reversing their direction so that the person is facing the back trailing carrier.

In some embodiments of the invention, the carrier can be configured as a moveable chair for indoor and outdoor use. Such an embodiment might include legs with rollers and a flip down footrest, engaged to the adaptor blocks. In an alternative embodiment, the carrier can be configured as a wheelchair to assist people with limited mobility.

In some embodiments of the invention, the carrier can be configured to create a moveable platform by removing both tires and releasably engaging four legs to the ends of the adaptor blocks.

In some embodiments of the invention, the carrier can be configured to create a "walker," that is, a device to help people who need some assistance in maintaining their balance while walking. In this embodiment, the carrier could be easily and quickly converted into a walker by removing handles 45 and 50, back poles, awning poles, safety handles, etc. Then front and rear stabilizing bars can be engaged to the adaptor bars, thus preventing the carrier from tipping forward or backward. Also, a handle can be releasably engaged to the adaptor blocks such that the handle is positioned parallel to the ground and about at waist level of the person needing assistance. Therefore, the carrier, which may have just been used as a rickshaw to transport a person from the beach to the car, can be easily configured as a walker to allow the person to walk without human assistance.

Figure 3:
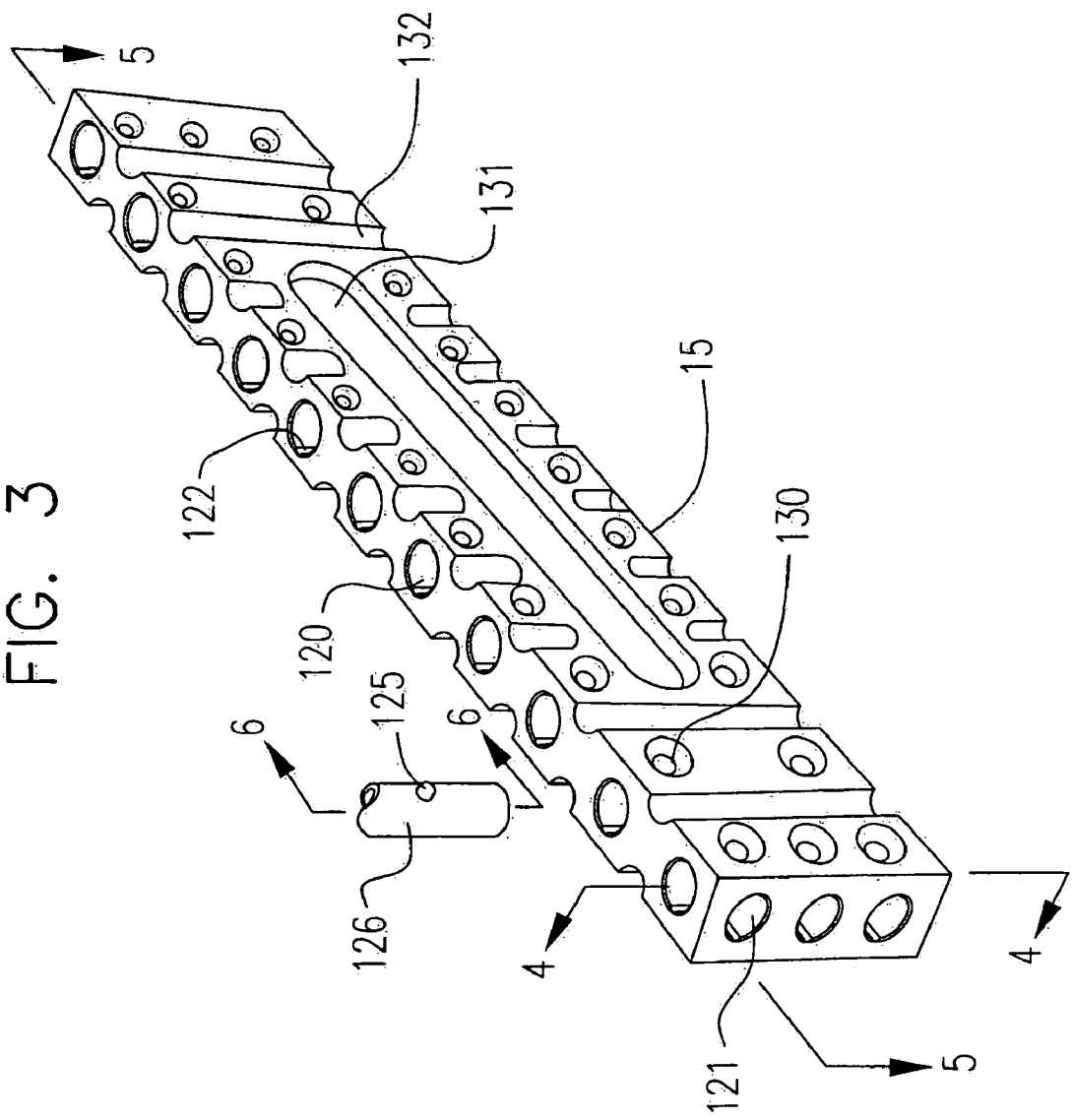
FIG. 3 is a perspective view of an adaptor block.

FIG. 3 depicts an adaptor block, shown generally at 15, with a plurality of engagable apertures 120 and 121 constructed on the top and end, respectively, of adaptor block 15. An engagement mechanism for releasably engaging a member 126 to an adaptor block 15 is shown by 125. A locating notch 122 is used to help guide engagement member 125 into securement aperture 130. A force can be applied to engagement mechanism 125, allowing it to recede into member 126. While engagement mechanism 125 is at least partially compressed, member 126 may be fitted into an aperture 120. Upon alignment with securement aperture 130, engagement mechanism 125 at least partially returns to its uncompressed position. One of ordinary skill in the art will recognize that a number of additional engagement mechanisms exist that are not depicted for releasably engaging a member to an adaptor block. Also, notches such as 131 and 132 may be routed into the adaptor block to decrease weight.

Figure 4:
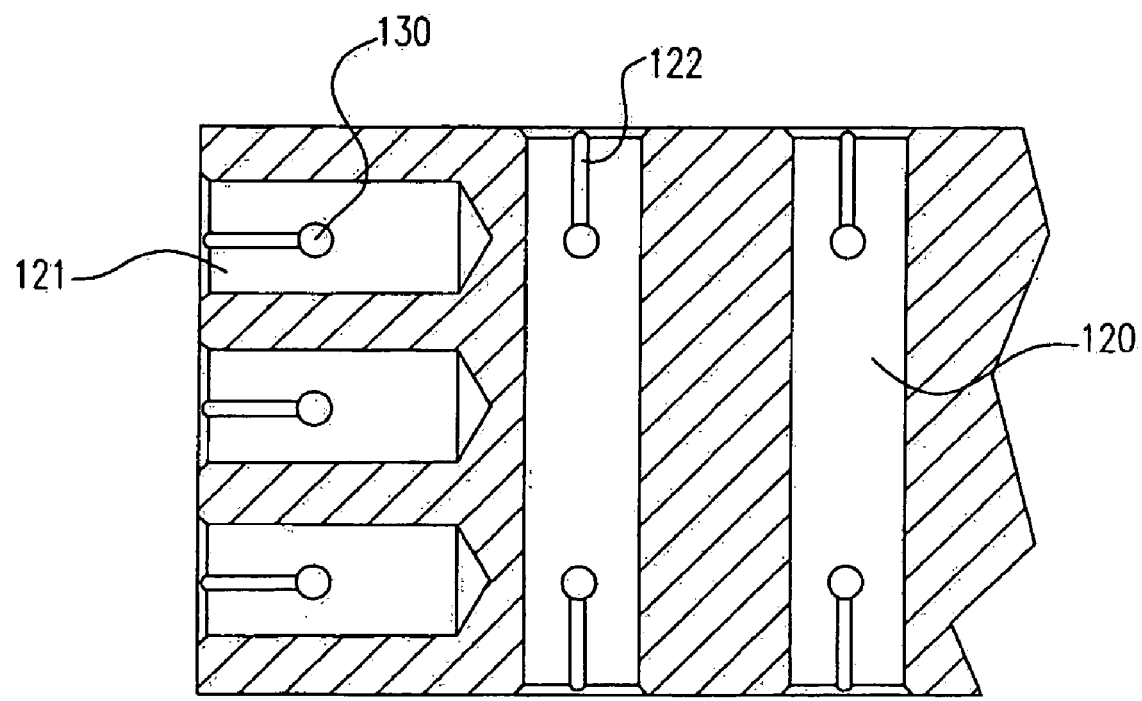
FIG. 4 is a fragmentary sectional detail of the side of adaptor block, taken along line 4—4 in FIG. 3.

FIG. 4 depicts a fragmentary sectional detail of the side of adaptor block 15, taken along line 4—4 in FIG. 3. Securement apertures 130 are shown to intersect top apertures 120 and end apertures 121. Locating notch 122 is also shown in order to guide engagement mechanism 125 into securement aperture 130. Adaptor block 15 can be designed to include numerous top and end apertures 120 and 121 thereby allowing multiple members to be engaged to the adaptor block, either along the top, along the end, or a combination of both. Furthermore, the members can be moved along the top or side of the adaptor block as desired in order to change the balance or alter the dimensions of the carrier.

Figure 5:
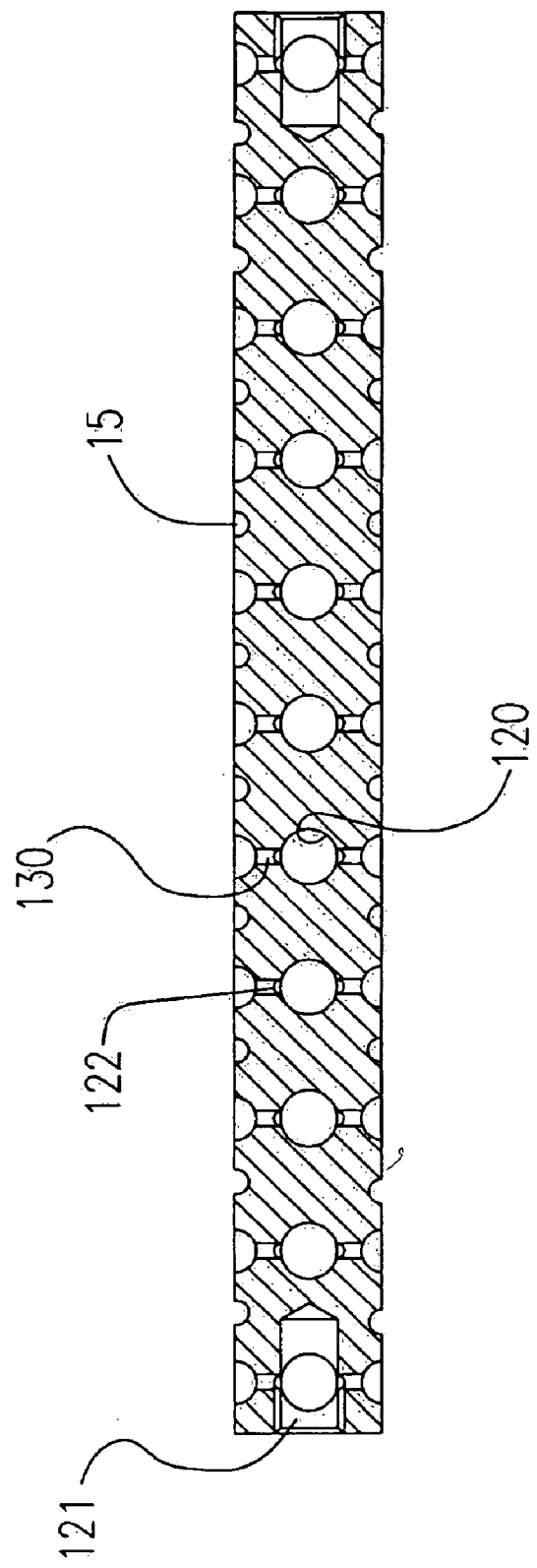
FIG. 5 is a cross-sectional view of an adaptor block, taken along line 5—5 in FIG. 3.

FIG. 5 shows a cross-sectional view of an adaptor block, shown generally at 15, taken along line 5—5 in FIG. 3. A plurality of top apertures 120 are shown spaced across the top of adaptor block 15, thereby providing member 126 with multiple positioning possibilities. Securement aperture 130 is shown intersecting top aperture 120 as well as end aperture 121. Locating notch 122 is routed into the adaptor block to help guide engagement mechanism 125 into securement aperture 130.

Figure 6:
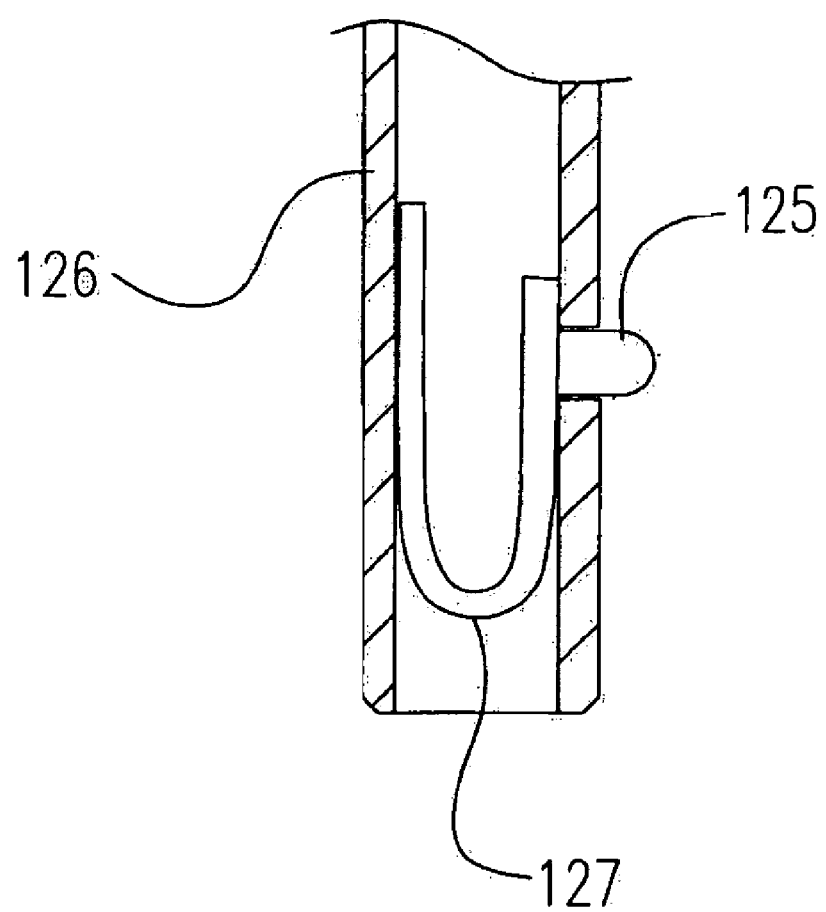
FIG. 6 is a fragmentary sectional detail of a member with an engagement mechanism, taken along line 6—6 in FIG. 3.

FIG. 6 depicts a fragmentary sectional detail of a member 126 with engagement mechanism 125, taken along line 6—6 in FIG. 3. As a force is applied to engagement mechanism 125, compression member 127 compresses, thereby at least partially reducing the profile of the engagement mechanism 125 relative to the exterior surface of member 126. Although a compression-style engagement mechanism is shown, one of ordinary skill in the art will recognize that a variety of other engagement mechanisms, such as insertion of detent pins after member alignment, may be used instead.

Figure 7:
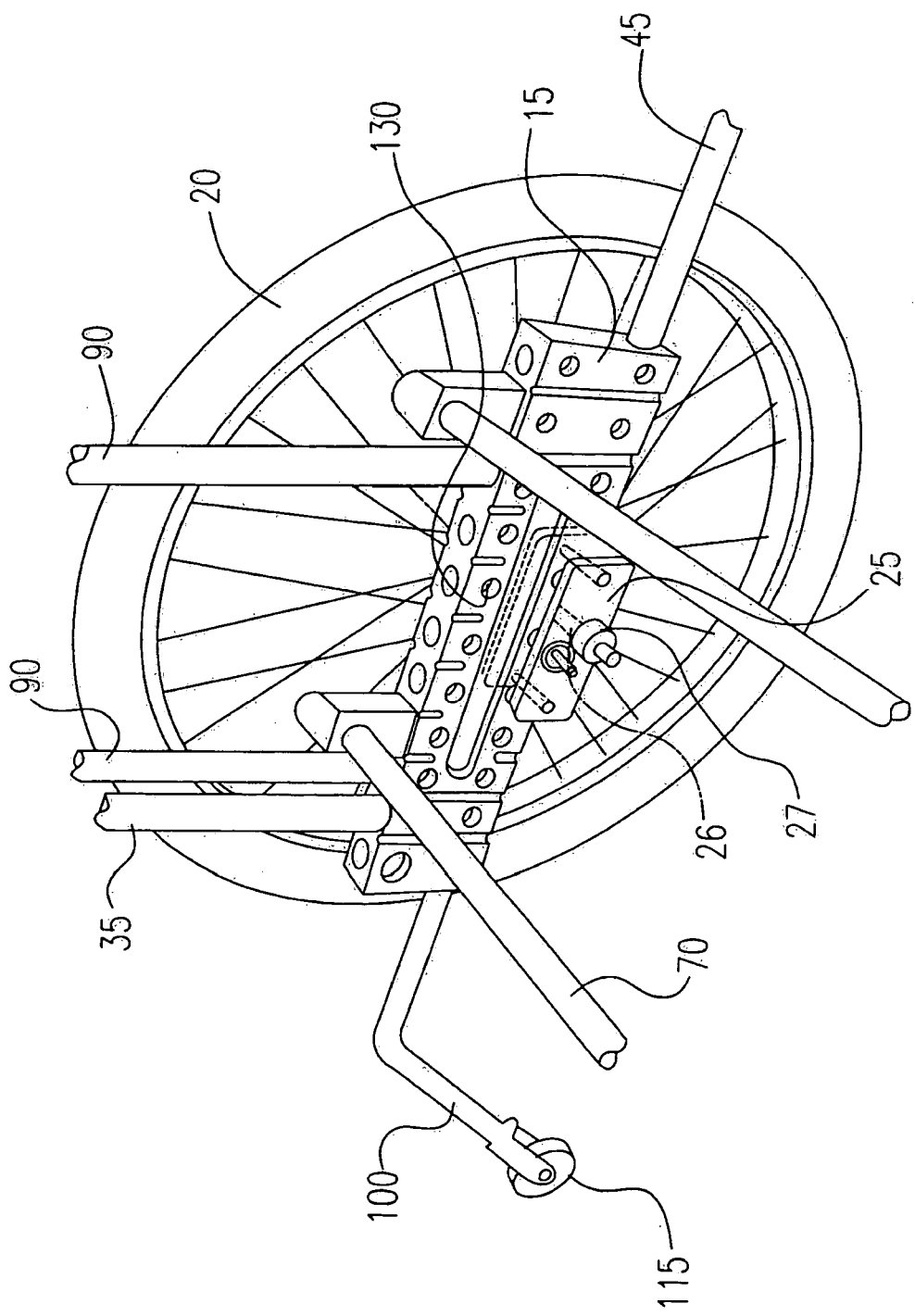
FIG. 7 is a perspective view of the locomotion mechanism engaged to the adaptor block.

FIG. 7 depicts adaptor block 15 releasably engaged to wheel 20 by engagement mechanism 25. Wheel axle 26 is secured to engagement mechanism 25 by locking mechanism 27. The versatility of the carrier is clearly depicted: multiple support poles 70, rear stabilizing bar 100, side handle 90, back support pole 35, handle assembly 45, and wheel 20 are all simultaneously releasably engaged to adaptor block 15. Furthermore, numerous other apertures are available to allow additional members to be engaged to the adaptor block or alternative placement of existing members.

Figure 8:
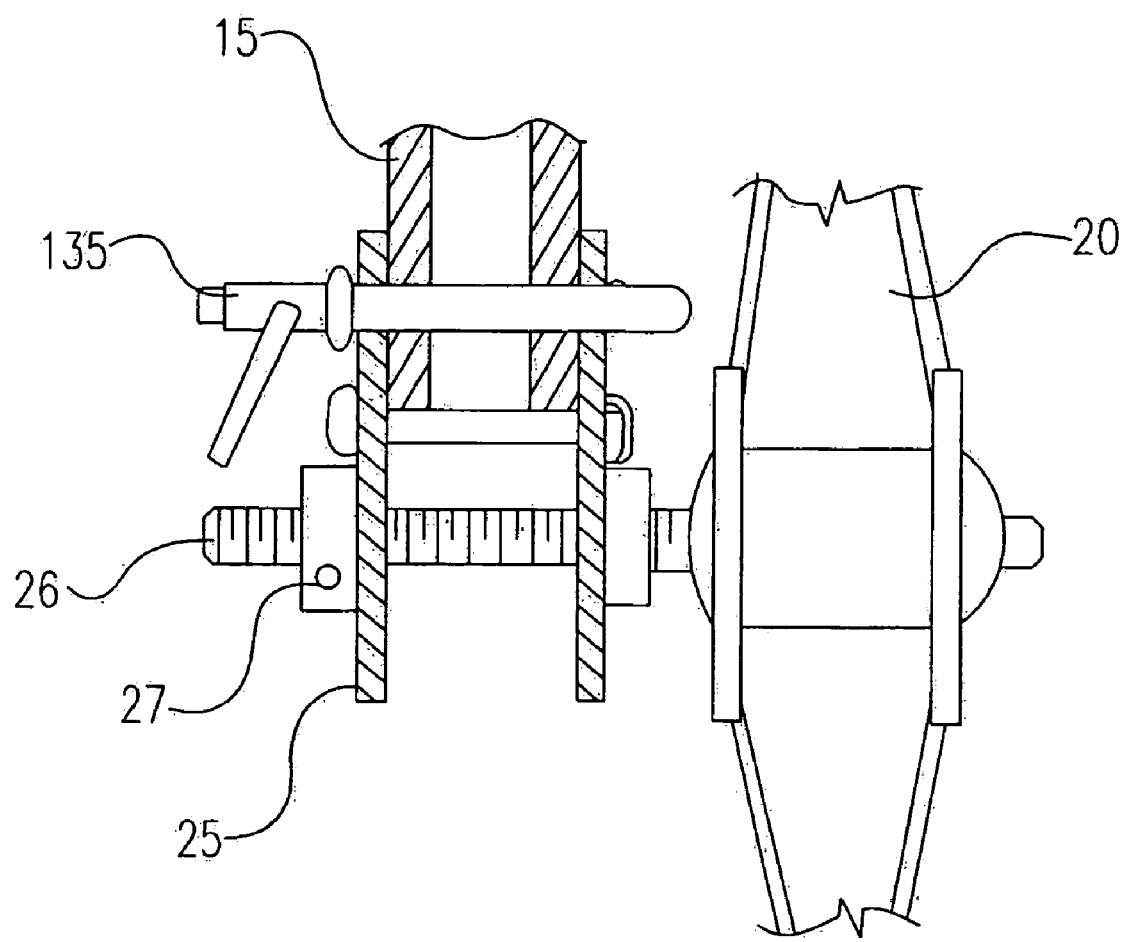
FIG. 8 is a fragmentary sectional detail taken along line 8—8 in FIG. 7.

FIG. 8 shows a fragmentary sectional detail taken along line 8—8 in FIG. 7. Wheel 20 is releasably engaged to adaptor block 15 by engagement mechanism 25. Detent pin 135 secures engagement 25 to adaptor block 15. Engagement mechanism 25 can be engaged to adaptor block 15 at various securement apertures 130 in order to change its center of balance to better distribute the cargo's weight. By selecting different securement apertures 130, the fulcrum point of the carrier can be transferred from the centerline of the main block to the new desired position. Furthermore, it is possible to add additional wheels to the carrier. By reducing the diameter of the wheels, multiple wheels can be releasably engaged to adaptor block 15.

Figure 9:
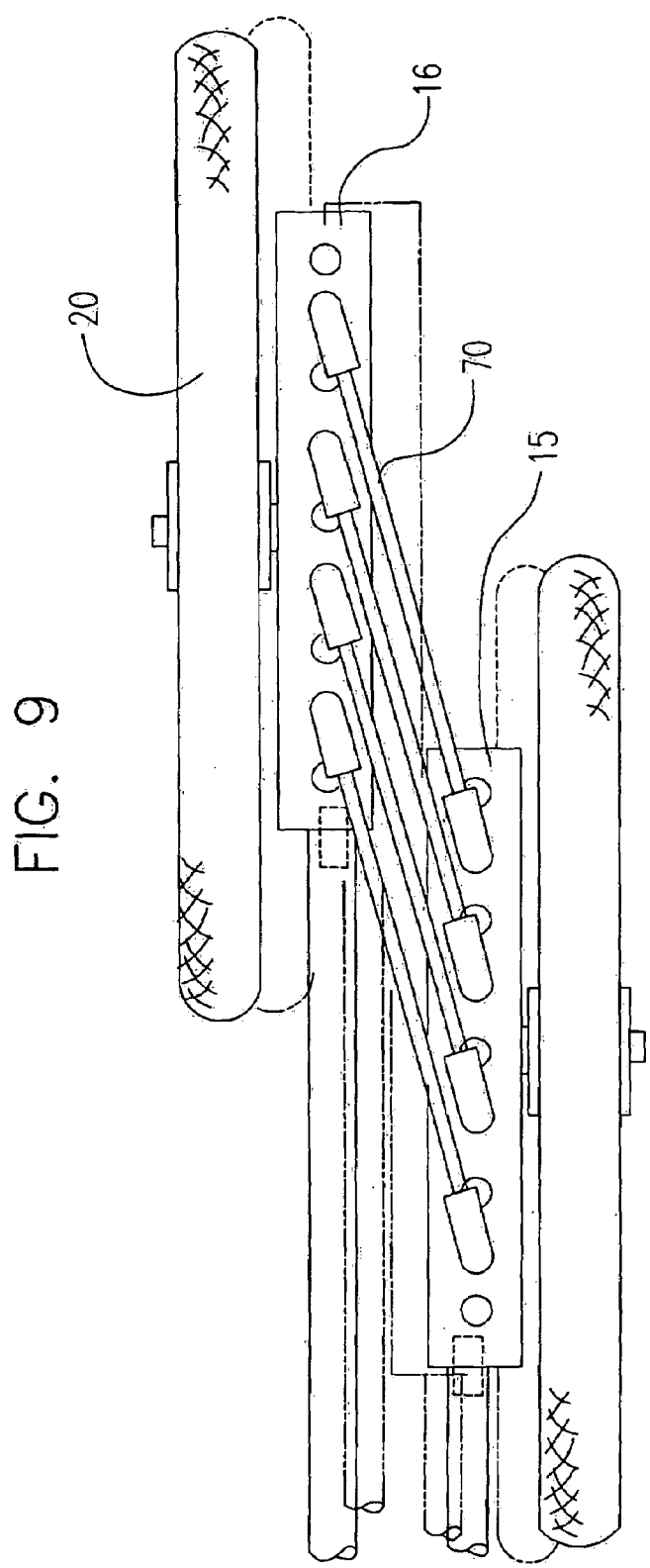
FIG. 9 is top view of the carrier, shown in a collapsed state.

FIG. 9 shows the carrier in a collapsed state. By compressing engagement mechanism 125 of support member 70 sufficiently enough so as to disengage engagement mechanism 125 from securement aperture 130, support members 70, while still engaged with first adaptor block 15 and second adaptor block 16, can be rotated so as to collapse the carrier as shown in FIG. 9. By providing a collapsibility feature, either partially or completely, the carrier becomes easy to transport or store. For instance, if used as a wheelchair, the carrier could transport a person to and from their destination, then the carrier can be easily collapsed in order to fit in the trunk of an automobile.

The multi use of the invention is only limited to a person's imagination. A single carrier or daisychaining them together can transport one or more people at the same time. Because it moves easily over grass surfaces and wood chip trails, individuals can be easily transported through parks, cemeteries, and yards. Additionally, it may be used as a carriage to move lovers throughout a scenic outdoor area. An angler can transport fishing gear to the shore or pier and then use it as a seat to sit upon. It would also make canoe portaging very easy. A hunter may use it to move hunting gear into the field and to carry out any game. Hunters and birdwatchers can use it as a portable blind. It can be used to push or pull cargo for one's personal use around the home, job site, or in the field.

While this invention may be embodied in many different forms, there are shown in the drawings and described in detail herein specific preferred embodiments of the invention. The present disclosure is an exemplification of the principles of the invention and is not intended to limit the invention to the particular embodiments illustrated.

The above disclosure is intended to be illustrative and not exhaustive. This description will suggest many variations and alternatives to one of ordinary skill in this art. All these alternatives and variations are intended to be included within the scope of the claims where the term "comprising" means "including, but not limited to." Those familiar with the art may recognize other equivalents to the specific embodiments described herein and such equivalents are also intended to be encompassed by the claims.

This completes the description of the preferred and alternate embodiments of the invention. Those skilled in the art may recognize other equivalents to the specific embodiment described herein which equivalents are intended to be encompassed by the claims attached hereto.

What is claimed is:

1. A portable, collapsible carrier comprising:
   a) at least one pair of adaptor blocks, each pair comprising a first and second adaptor block, each of said first and second adaptor blocks having a left and right side, first and second ends, and a top and bottom, each adaptor block constructed and arranged to include a plurality of engagable, spaced apertures on at least one side and one end;
   b) at least two support poles, the at least two support poles extending between a pair of adaptor blocks, the at least two support poles having first and second ends, the first ends of the at least two support poles adapted to be releasably engaged to a first adaptor block via the engagable apertures, the second ends of the at least two support poles adapted to be releasably engaged to a second adaptor block via the engagable apertures;
   c) an engagement mechanism for releasably engaging the first ends of the at least two support poles to the first adaptor block via the engagable apertures and the second ends of the at least two support poles to the second adaptor block via the engagable apertures;
   d) a locomotion mechanism;
   e) an engagement mechanism for releasably engaging the locomotion mechanism to at least one of said first and second adaptor blocks via the engagable apertures;
   f) first and second back poles, the first and second back poles having ends, the first end of the first back pole adapted to be releasably engaged to the first adaptor block via an engagable aperture, the first end of the second back pole adapted to be releasably to the second adaptor block via an engagable aperture;
   g) an engagement mechanism for releasably engaging the first end of the first back pole to the first adaptor block via an engagable aperture and the first end of the second back pole to the second adaptor block via an engagable aperture; and
   h) material extending between the first and second back poles to provide a back support.

2. The portable, collapsible carrier of claim 1 wherein there is included a seat, the seat supported by the support poles.

3. The portable, collapsible carrier of claim 1 wherein there is included a protective screen and a member, the member having ends, the protective screen adapted to be coupled to the first end of the member, the second end of the member adapted to be releasably engaged to an adaptor block via an engagable aperture.

* * * * *